J. CLOSS.
PORTABLE FENCE.
No. 96,084.        Patented Oct. 26, 1869.
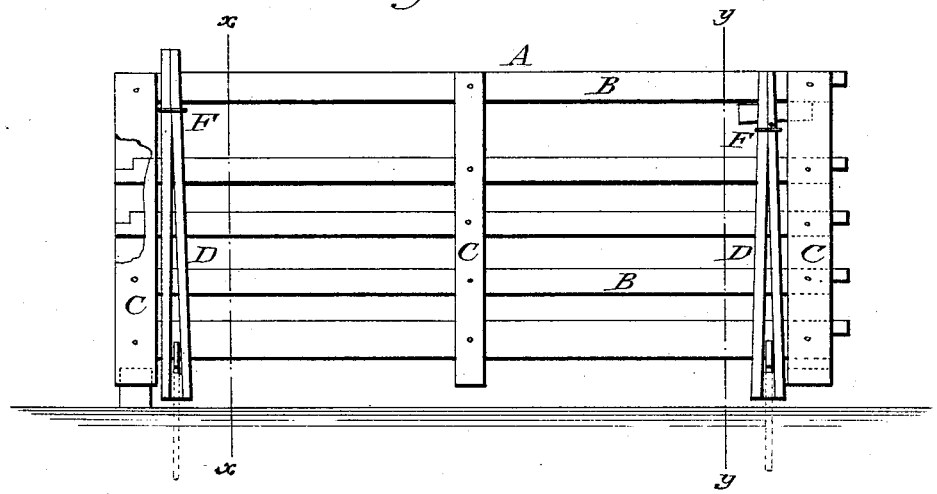
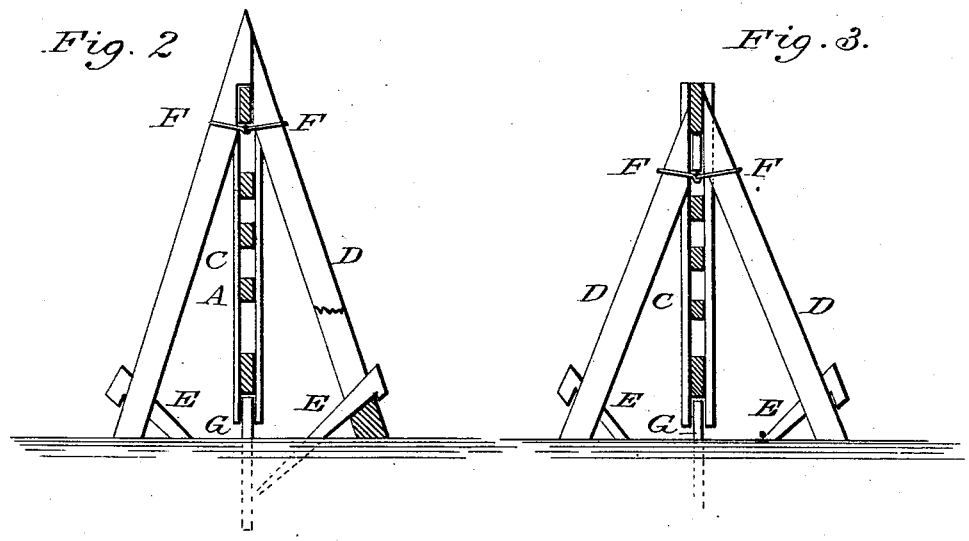
Witnesses:
Chas Niela
W. G. Class
Inventor:
per J. Closs

United States Patent Office.

JACOB CLOSS, OF DECATUR, INDIANA.

Letters Patent No. 96,084, dated October 26, 1869.

---

IMPROVEMENT IN PORTABLE FENCE.

---

The Schedule referred to in these Letters Patent and making part of the same.

---

*To all whom it may concern:*

Be it known that I, JACOB CLOSS, of Decatur, in the county of Adams, and State of Indiana, have in-invented a new and improved Portable Fence; and I do hereby declare that the following is a full, clear, and exact description thereof, which will enable those skilled in the art to make and use the same, reference being had to the accompanying drawings, forming part of this specification.

This invention relates to a new and useful improvement in fences for farm and other purposes, and consists in the construction and combination of parts as hereinafter described.

In the accompanying drawing—

Figure 1 represents a side elevation of the fence.

Figures 2 and 3 are vertical cross-sections of fig. 1, through the lines $x\ x$ and $y\ y$.

Similar letters of reference indicate corresponding parts.

A is the fence, constructed of horizontal rails, B, and upright slats, C, fastened together by nails or pins, as seen in the drawing.

D represents braces, which are arranged in pairs near each end of a length of a fence, and placed bracing on each side, as represented in figs. 2 and 3.

Each brace is made of two parts, which are drawn together at the top ends, and spread apart at their lower ends, so as to admit the hook-stakes E between them, which stakes are driven into the ground for holding the braces down.

F represents staples or clevises, which are hooked together in the centre, forming double clevises, as represented in figs. 2 and 3.

These clevises enclose the parts of each brace, and they are placed just below the top rail of the fence, so that the fence is supported thereon, clear of the ground.

The braces may be arranged in any substantial manner. I prefer the method shown in fig. 2, where their ends extend above the fence, and hook over the top rail, but I do not confine myself to that particular mode.

The modification shown in fig. 3, where the ends of the braces do not extend above the fence, is designed to answer the same purpose. Other modifications may, perhaps, be made by which the desired results will be produced, that is, (in combination with the double clevises,) to firmly and securely support the fence.

In case of a fence over water, the former method is preferable, as the fence will be held down by the hooks on the braces.

Stakes may be driven into the ground for keeping the fence in a vertical position, as seen at G G. It will be seen that by this arrangement the fence may be taken up at any time, (by withdrawing the hooked stakes E,) and removed to any other desired locality.

The advantages of this method of construction are many, and will be readily understood and appreciated by farmers and others interested in the subject.

Having thus described my invention,

What I claim as new, and desire to secure by Letters Patent, is—

1. In combination with a fence, the braces D, hooked stakes E, and double iron clevises F, combined and arranged substantially as described, and for the purpose set forth.

2. Making each brace in two parts, and spreading the parts so as to admit a stake between them, substantially as and for the purpose described.

JACOB CLOSS.

Witnesses:
J. R. BOBO,
S. WORDEN.